United States Patent
Wu (10) Patent No.: US 12,316,639 B2
(45) Date of Patent: May 27, 2025

(54) ACCESS CONTROL LIST MANAGEMENT METHOD, DATA STORAGE DEVICE AND COMPUTER-READABLE MEDIUM

(71) Applicant: QNAP Systems, Inc., New Taipei (TW)

(72) Inventor: Tsu-Yu Wu, New Taipei (TW)

(73) Assignee: QNAP Systems, Inc., New Taipei (TW)

( * ) Notice: Subject to any disclaimer, the term of this patent is extended or adjusted under 35 U.S.C. 154(b) by 215 days.

(21) Appl. No.: 18/148,302

(22) Filed: Dec. 29, 2022

(65) Prior Publication Data

US 2024/0121241 A1 Apr. 11, 2024

(30) Foreign Application Priority Data

Oct. 7, 2022 (TW) .................................. 111138264

(51) Int. Cl.
*H04L 9/40* (2022.01)
*G06F 18/214* (2023.01)

(52) U.S. Cl.
CPC .......... *H04L 63/101* (2013.01); *G06F 18/214* (2023.01)

(58) Field of Classification Search
CPC .............................. H04L 63/101; G06F 21/604
See application file for complete search history.

(56) References Cited

U.S. PATENT DOCUMENTS

| 6,823,338 | B1* | 11/2004 | Byrne | G06F 21/6227 |
| | | | | 707/999.009 |
| 8,281,009 | B2* | 10/2012 | Kamei | H04L 61/457 |
| | | | | 709/224 |
| 2005/0114655 | A1* | 5/2005 | Miller | H04L 63/0263 |
| | | | | 713/163 |
| 2022/0405240 | A1* | 12/2022 | Wu | G06F 16/164 |
| 2024/0121241 | A1* | 4/2024 | Wu | H04L 63/101 |

FOREIGN PATENT DOCUMENTS

TW 200830141 A 7/2008

\* cited by examiner

*Primary Examiner* — Ponnoreay Pich
(74) *Attorney, Agent, or Firm* — RANKIN, HILL & CLARK LLP (57) ABSTRACT

An access control list (ACL) management method is provided. The ACL management method is used in a file system and includes: storing an ACL pattern, where the ACL pattern corresponds to a subtree of a directory tree in the file system and includes a root access control list (RACL), the ACL of the root node of the subtree is the RACL, the ACL of each non-root directory of the subtree is the same inherited directory access control list (DACL) generated according to the RACL, and the ACL of each non-root file of the subtree is the same inherited file access control list (FACL) generated according to the RACL. A data storage device and a computer-readable medium for executing the ACL management method are also provided.

11 Claims, 8 Drawing Sheets

ACCESS CONTROL LIST MANAGEMENT METHOD, DATA STORAGE DEVICE AND COMPUTER-READABLE MEDIUM

BACKGROUND

1. Technical Field

The present disclosure relates to access control list (ACL). The present disclosure further relates to an ACL management method, a data storage device and a computer-readable medium.

2. Description of Related Art

In the file system of a conventional operating system, all directories and files form a directory tree, and each node of the directory tree is a directory or a file. Each directory and each file has a corresponding ACL, and each ACL includes at least one access control entry (ACE). Each ACE includes the access permissions of a user or a user group on the directory or the file, such as whether the user or the users in the group are allowed to read or write into the directory or the file. In other words, the operating system controls user access to directories or files according to ACLs.

However, the huge number of employees in large enterprises or large organizations entails complex permission structures. For example, the ACL of a directory or a file may contain hundreds of ACEs. In addition, the internal data of a large enterprise or a large organization can be massive and complex, so there will be many directories and files in the file system, forming a multi-layer complex structure of the directory tree. In addition, the ACLs of most directories and files are usually directly inherited from the parent directories, so their ACLs are the same as those of the parent directories, thus a large number of identical ACLs are repeatedly stored, resulting in a waste of storage space.

Furthermore, if the user needs to recursively modifies the ACL of the nodes in the directory tree, the operating system needs to traverse the nodes in the directory tree to modify the ACLs of the nodes one by one. The modification of the ACLs of a large number of directories and files in the file system consumes a lot of time. In addition, the long processing time increases the risk of unexpected interruptions resulting in inconsistent ACLs of nodes with inheritance relationships.

SUMMARY

In order to solve the above technical issues, the present disclosure provides an access control list (ACL) management method used in a file system, the ACL management method comprising: storing an ACL pattern, the ACL pattern corresponding to a subtree of a directory tree in the file system and including a root access control list (RACL), an ACL of a root node of the subtree being the RACL, an ACL of each non-root directory of the subtree being an inherited directory access control list (DACL) generated according to the RACL, and an ACL of each non-root file of the subtree being an inherited file access control list (FACL) generated according to the RACL.

The present disclosure further provides a data storage device with a file system installed in the data storage device to execute the aforementioned ACL management method.

The present disclosure further provides a computer-readable medium applied in a data storage device and storing instructions to execute the aforementioned ACL management method.

The present disclosure merges and stores the ACLs of directories and files with inheritance relationship as ACL patterns, so as to solve the problem of repeated storage of identical ACLs. Moreover, the present disclosure forms the ACL patterns into a pattern tree corresponding to the directory tree, so as to reduce the time required to modify ACLs.

DETAILED DESCRIPTION OF THE EMBODIMENTS

The following examples are used for illustrating the present disclosure. A person skilled in the art can easily conceive the other advantages and effects of the present disclosure based on the disclosure of the specification. The present disclosure can also be implemented or applied as described in different examples. It is possible to modify or alter the following examples for carrying out this disclosure without contravening its spirit and scope, for different aspects and applications.

The present disclosure provides an ACL management method to simplify the storage and modification of ACLs of directories and files in a file system.

Figure 1:
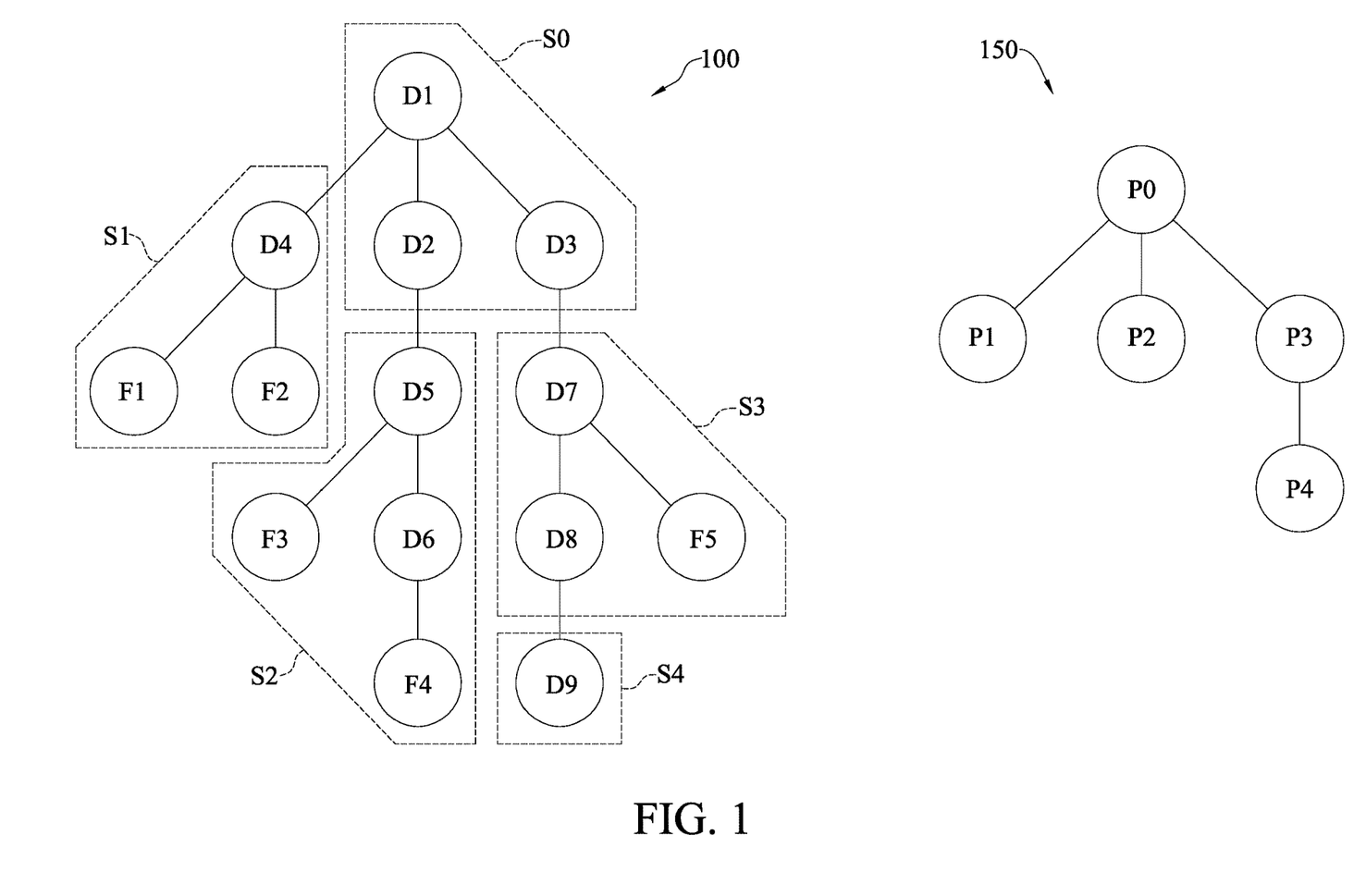
FIG. 1 is a schematic diagram showing a directory tree and an ACL pattern tree according to an ACL management method in an embodiment of the present disclosure.

FIG. 1 shows a directory tree 100 and an ACL pattern tree (also known as pattern tree) 150 in a file system according to an embodiment of the present disclosure.

The directory tree 100 may be a stand-alone tree-like data structure, or a part of another larger directory tree. In an embodiment, the directory tree 100 includes nine directories D1 to D9 and five files F1 to F5. The directories D1 to D9 and the files F1 to F5 may also be referred to as nodes of the directory tree 100. The directory D1 is the root node of the directory tree 100. The directories D1 to D9 and the files F1 to F5 respectively belong to five subtrees S0 to S4 of the directory tree 100. The subtree S0 includes the directories D1 to D3. The subtree S1 includes the directory D4 and the files F1 and F2. The subtree S2 includes the directories D5, D6 and the files F3, F4. The subtree S3 includes the directories D7, D8 and the file F5. The subtree S4 includes only the directory D9, and does not include any file.

In addition, the pattern tree 150 includes five ACL patterns (also simply known as patterns) P0-P4. The patterns P0-P4 may also be referred to as nodes of the pattern tree 150. The patterns P0 to P4 correspond to the subtrees S0 to S4 of the directory tree 100, respectively. The patterns P0-P4 preserve the hierarchical relationship between the subtrees S0-S4.

In other words, if the root node of a certain subtree is an ancestor node of the root node of another subtree, then the pattern corresponding to the certain subtree is an ancestor node of the pattern corresponding to the another subtree. In an embodiment, the root node D1 of the subtree S0 is an ancestor node of the root node D7 of the subtree S3, thus the pattern P0 corresponding to the subtree S0 is an ancestor node of the pattern P3 corresponding to the subtree S3. For another example, the root node D1 of the subtree S0 is an ancestor node of the root node D9 of the subtree S4, thus the pattern P0 corresponding to the subtree S0 is an ancestor node of the pattern P4 corresponding to the subtree S4.

The subtrees S0-S4 define ACL inheritance relationships in the directory tree 100. In detail, for any one subtree S0-S4, the ACL of each non-root node of that subtree is inherited from the root node of that subtree, and the ACL of each node of that subtree is not inherited from any ancestor subtree of that subtree. In an embodiment, the ACLs of the nodes D6, F3 and F4 other than the root node D5 of the subtree S2 are all inherited from the root node D5 of the subtree S2, and the ACL of each node of the subtree S2 is not inherited from the subtree S0. For another example, the ACL of each node of the subtree S4 is not inherited from the subtree S3, nor is it inherited from the subtree S0.

In each subtree, the ACLs of the non-root nodes are all inherited from the root node of the subtree, so the ACLs are the same as or very similar to each other. Therefore, the ACLs of the nodes of the same subtree can be summarized and stored in the pattern corresponding to the subtree.

In an embodiment, each pattern P0-P4 includes a root access control list (RACL), an inherited directory access control list (DACL) and an inherited file access control list (FACL) of the corresponding subtree S0-S4. The DACL and the FACL of each pattern P0-P4 are generated according to the RACL of the same pattern. For each subtree S0-S4, the ACL of the root node of the subtree is the RACL in the corresponding pattern P0-P4, the ACL of each non-root directory of the subtree is the DACL in the corresponding pattern P0-P4, and the ACL of each non-root file of the subtree is the FACL in the corresponding pattern P0-P4. For example, the ACL of the root node D5 of the subtree S2 is the RACL in the pattern P2, the ACL of the directory D6 of the subtree S2 is the DACL in the pattern P2, and the ACLs of the files F3 and F4 of the subtree S2 are both the FACL in the pattern P2.

In each pattern P0-P4, the RACL includes at least one access control entry (ACE) and the inheritance setting of each ACE. Each ACE includes the access permissions of a user or a user group on the nodes of the subtree corresponding to the pattern to which the ACE belongs. The inheritance setting of each ACE is used to set, in the subtree corresponding to the pattern to which the ACE belongs, whether a descendant node of the root node of the subtree is allowed to inherit the ACE when the descendant node is created. For the RACL of any one pattern P0-P4, the DACL of the pattern can be obtained by removing the ACEs that are not allowed to be inherited along with the inheritance settings of the ACEs from the RACL. In other words, in any one pattern P0-P4, the DACL is a list of ACEs in the RACL that allow inheritance and the inheritance settings of the ACEs that allow inheritance, while the FACL only includes the ACEs in the RACL that allow inheritance and does not include any inheritance setting.

The directory tree 100 and the pattern tree 150 in FIG. 1 are merely examples used for illustration. The present disclosure does not limit the number of subtrees in the directory tree, the number of nodes in each subtree, or the number of patterns in the pattern tree.

In an embodiment, the pattern tree 150 is stored in the file system in the form of a table, such as the following Table 1. Each pattern is stored as a row in the table, and each pattern includes the index of the pattern in the file system, the index of the parent node (parent pattern) of the pattern in the pattern tree in the file system, and the index of the index node (inode) of the root node of the subtree corresponding to the pattern in the file system. In an embodiment, the indices of the patterns P0-P4 are 0-4. The RACL, DACL and FACL of the patterns P0-P4 are RL0-RL4, DL0-DL4 and FL0-FL4, respectively. The indices of the inodes of the directories D1-D9 are 1-9. Therefore, the patterns P0-P4 can be stored as the second to sixth rows in Table 1, respectively. Table 1 may be referred to as an ACL pattern table or simply a pattern table.

TABLE 1

| Pattern Index | Parent Pattern Index | Root Inode | RACL | DACL | FACL |
|---|---|---|---|---|---|
| 0 | None | 1 | RL0 | DL0 | FL0 |
| 1 | 0 | 4 | RL1 | DL1 | FL1 |
| 2 | 0 | 5 | RL2 | DL2 | FL2 |
| 3 | 0 | 7 | RL3 | DL3 | FL3 |
| 4 | 3 | 9 | RL4 | DL4 | FL4 |

The inode of each node of each subtree stores the index of the corresponding pattern. For example, the inodes of the nodes D1-D3 of the subtree S0 all store the index 0 of the pattern P0, and the inodes of the nodes D5, D6, F3 and F4 of the subtree S2 all store the index 2 of the pattern P2. When a user needs to access a node of the directory tree, the file system can obtain the RACL, DACL or FACL of the corresponding pattern from the pattern table according to the index of the corresponding pattern stored in the inode of the node to determine whether the user has the permissions for accessing the node of the directory tree.

The file system of a large enterprise or a large organization is huge and complex, and a subtree of its directory tree may have hundreds or thousands of nodes, or even more nodes. If the conventional technology is used, one ACL must be stored for each node, and hundreds or even thousands of ACLs must be stored in total. If the ACL pattern tree of the present disclosure is adopted, the number of ACLs that need to be stored can be reduced from hundreds or even thousands to three, thereby reducing the storage space required for ACLs and shortening the processing time required for modifying ACLs.

For example, if it is necessary to modify the ACL of each node in the entire directory tree, the file system only needs to traverse a few nodes in the pattern tree to quickly finish the modification without traversing each node in the huge and complex directory tree.

In addition to improving the efficiency of modification, the scope of modification can also have more flexibility. For example, a user can specify the scope of modifying the ACLs as all nodes in a subtree without affecting other subtrees. For this kind of modification, the file system only needs to modify the pattern corresponding to the subtree, and does not need to modify the other patterns.

In addition, the initial directory tree may have only one node, i.e., the root node or the root directory, and the root node constitutes the only subtree in the directory tree and corresponds to the only one pattern in the pattern tree. A user can create new directories or new files under the root directory to expand the directory tree. The ACLs of new directories and new files are inherited from their parent nodes by default, so no new pattern will be added. If the user modifies the ACL of a directory or a file, a new pattern may be generated to expand the pattern tree. When a new pattern is generated, the above-mentioned modified directory or file will become the root node of a new subtree corresponding to the new pattern. Details of the above-mentioned operations are discussed in the following embodiments.

In an embodiment, the user can instruct the file system to create a new directory or a new file under any existing directory in the directory tree. The file system will store the index of the corresponding pattern of the subtree to which the existing directory belongs into the inode of the new directory or the new file (wherein the index of the corresponding pattern can be directly taken from the inode of the existing directory), so that the new directory inherits the DACL of the existing directory, or the new file inherits the FACL of the existing directory.

Figure 2:
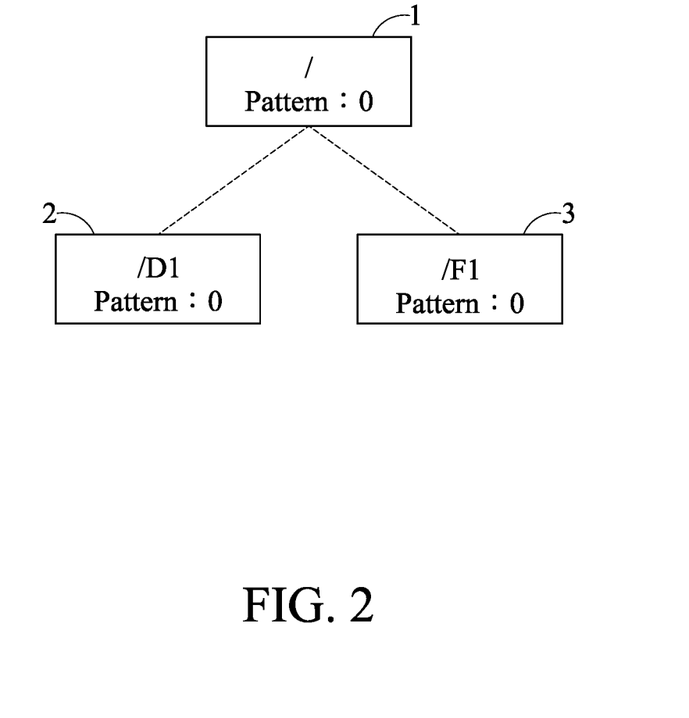
FIG. 2 to FIG. 8 are schematic diagrams showing the modification of ACLs according to various embodiments of the present disclosure.

FIG. 2 shows the inodes 1-3 in an embodiment of the present disclosure, wherein each inode is marked with its corresponding node in the directory tree and the pattern index stored in the inode. The directory tree contains only one subtree, so the subtree corresponds to the only pattern in the pattern tree, and the index of the pattern is 0. Inode 1 is the inode of the root node (that is, the root directory "/") of the directory tree. Inode 2 is the inode of the directory D1 under the root directory. Inode 3 is the inode of the file F1 under the root directory. Inodes 1-3 all store the pattern index 0.

FIG. 2 shows the connection relationship between the directory tree nodes corresponding to each inode with dashed lines, so as to present the structure of the directory tree. The pattern tree in this embodiment is shown in Table 2 below.

TABLE 2

| Pattern Index | Parent Pattern Index | Root Inode | RACL | DACL | FACL |
|---|---|---|---|---|---|
| 0 | None | 1 | RL0 | DL0 | FL0 |

In an embodiment, the initial directory tree has only one root node, and then the user creates a directory D1 and a file F1. When creating the directory D1, the file system stores the pattern index 0 into the inode 2 of the directory D1. When creating the file F1, the file system stores the pattern index 0 into the inode 3 of the file F1. The directory D1 and the file F1 inherit the DACL and the FACL of the pattern 0, respectively. Therefore, there is no need to create a new pattern, and there is still only one pattern 0 in the pattern tree.

In an embodiment, the user can instruct the file system to modify the ACL of any one node in any subtree of the directory tree, or modify the ACL of any one node and descendant nodes of that node in the subtree. The modification may be setting, resetting or editing, where "setting" means setting the ACL of the node(s) to the ACL specified by the user. "Resetting" means setting the ACL of the node(s) to the default ACL preset by the file system or the operating system. "Editing" refers to editing the original ACL of the node(s), such as editing the access permissions in an ACE, adding at least one ACE, or deleting at least one ACE.

When the ACL of one or more nodes in a subtree needs to be modified, the above-mentioned nodes whose ACL needs to be modified may be referred to as the scope of the modification. The file system will check whether the scope includes only a part of the nodes of the subtree, or all nodes of the subtree.

If the scope includes only a part of the nodes of the subtree, the file system creates a new pattern, sets the RACL, DACL and FACL of the new pattern to be the RACL', DACL' and FACL' generated by the modification, and stores the index of the new pattern in the inode of each node in the scope. If the scope includes all nodes of the subtree, the file system directly sets the RACL, DACL and FACL of the pattern corresponding to the subtree to be the RACL', DACL' and FACL' generated by the above-mentioned modification, and does not need to create the new pattern.

In detail, if the modification is setting, the file system uses the ACL specified by the user as the above-mentioned RACL', and then generates DACL' and FACL' according to RACL'. The details of the generation of DACL' and FACL' are the same as those of the above-mentioned generation of DACL and FACL according to RACL. If the modification is resetting, the file system uses the default ACL as the above-mentioned RACL', and then generates DACL' and FACL' according to RACL'. Furthermore, if the modification is editing, the file system edits the original RACL to become the above-mentioned RACL', and then generates DACL' and FACL' according to RACL'.

For example, the original RACL, DACL and FACL of the pattern 0 are as follows.

RACL=(user1$rwxi$,user2$r$--$i$,user3$rw$--)

DACL=(user1$rwxi$,user2$r$--$i$)

FACL=(user1$rwx$-,user2$r$---)

Wherein the RACL of the pattern 0 includes three ACEs. The first ACE indicates that the user user1 has the permissions to read (r), write (w) and execute (x), and the inheritance setting of the first ACE is allowing inheritance (i). The second ACE indicates that the user user2 only has the permission to read (r), and the inheritance setting of the second ACE is allowing inheritance (i). The third ACE indicates that the user user3 has both read (r) and write (w) permissions, and the inheritance setting of the third ACE is disallowing inheritance (-). Therefore, the DACL generated according to the RACL only includes the first two ACEs that allow inheritance, but not includes the third ACE that does not allow inheritance. The FACL generated according to the RACL is the result of removing the inheritance settings of the ACEs in the DACL.

If the ACL of the pattern 0 is modified to add the write permission (w) for user2, then the RACL', DACL' and FACL' after the modification of the pattern 0 are as follows, wherein the file system can modify RACL to generate RACL', then generate DACL' and FACL' according to RACL'.

RACL'=(user1$rwxi$,user2$rw$-$i$,user3$rw$--)

DACL'=(user1$rwxi$,user2$rw$-$i$)

FACL'=(user1$rwx$-,user2$rw$--)

In addition, when creating the new pattern, the file system checks whether the scope of the modification includes the root node of the subtree. If the scope does not include the root node of the subtree, the file system sets the parent pattern of the new pattern to be the pattern corresponding to the subtree. If the scope includes the root node of the subtree, the file system sets the parent pattern of the new pattern to be the parent pattern of the pattern corresponding to the subtree.

Figure 3:
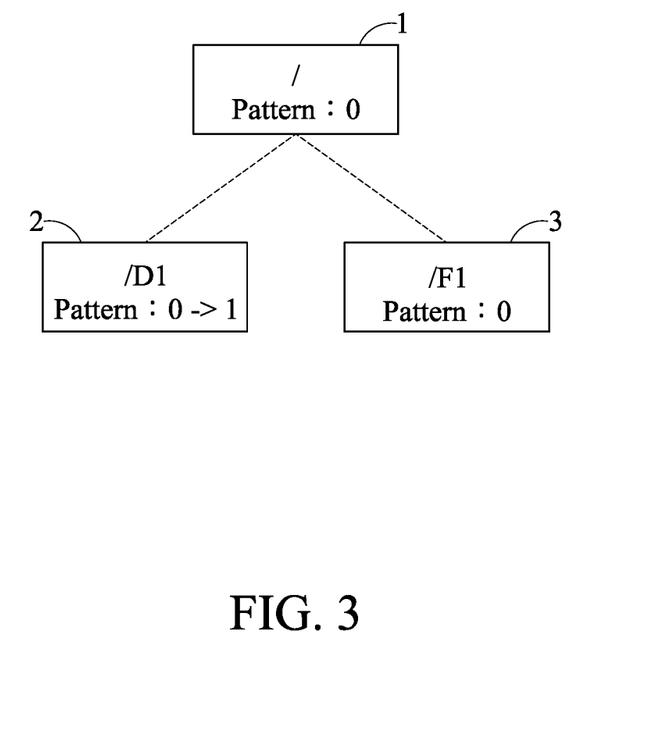

In the first embodiment, as shown in FIG. 3, the user instructs the file system to modify the ACL of the directory "/D1" under the root directory "/" of the directory tree. Before the modification, the subtree to which the directory "/D1" belongs corresponds to the pattern 0, and includes the directory tree nodes corresponding to the inodes 1-3. Therefore, the scope of the modification includes only one node of the subtree, namely, the directory tree node corresponding to the inode 2, rather than all the nodes of the subtree. Therefore, the file system creates a new pattern 1, sets the root inode of the new pattern 1 to be the inode 2 corresponding to the directory "/D1," sets the RACL, DACL and FACL of the new pattern 1 to be the RL1, DL1 and FL1 generated by the modification, and modifies the pattern index stored in the inode 2 of the directory "/D1" from 0 to 1. In addition, the scope of this modification does not include the root node of the subtree, i.e., the root directory "/" corresponding to the inode 1, thus the file system sets the parent pattern of the new pattern 1 to be the pattern 0 corresponding to the subtree. The pattern tree after this modification is shown in Table 3 below, wherein the new pattern 1 added due to this modification is shown in an italic and bold font.

TABLE 3

| Pattern Index | Parent Pattern Index | Root Inode | RACL | DACL | FACL |
|---|---|---|---|---|---|
| 0 | None | 1 | RL0 | DL0 | FL0 |
| *1* | *0* | *2* | *RL1* | *DL1* | *FL1* |

Figure 4:
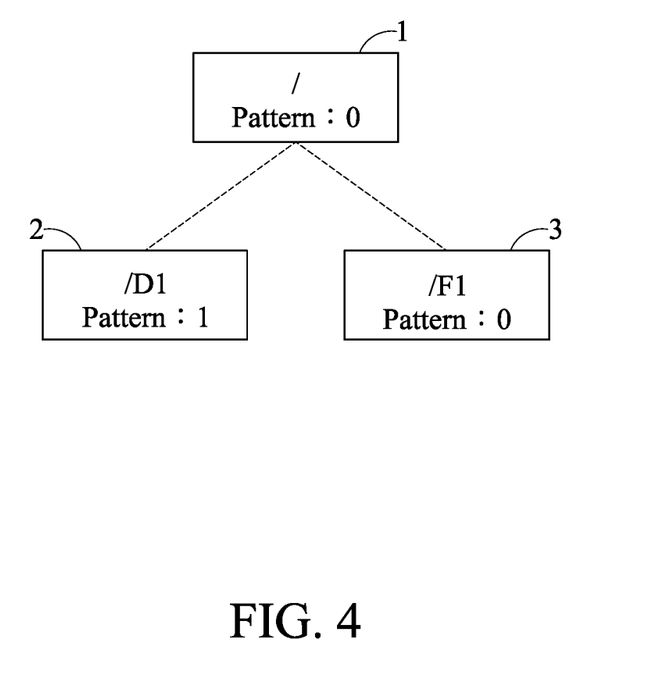

In the second embodiment, as shown in FIG. 4, the user instructs the file system to modify the ACL of the directory "/D1" under the root directory "/" of the directory tree. Before the modification, the subtree to which the directory "/D1" belongs corresponds to the pattern 1, and the directory "/D1" is the root node and the only node of the subtree. Therefore, the scope of the modification includes all nodes of the subtree, so the file system does not create a new pattern, but directly sets the RACL, DACL and FACL of the pattern 1 to be the RL1', DL1' and FL1' generated by the modification. The pattern tree after this modification is shown in Table 4 below, wherein the fields modified by this modification are shown in an italic and bold font.

TABLE 4

| Pattern Index | Parent Pattern Index | Root Inode | RACL | DACL | FACL |
|---|---|---|---|---|---|
| 0 | None | 1 | RL0 | DL0 | FL0 |
| 1 | 0 | 2 | *RL1'* | *DL1'* | *FL1'* |

Figure 5:
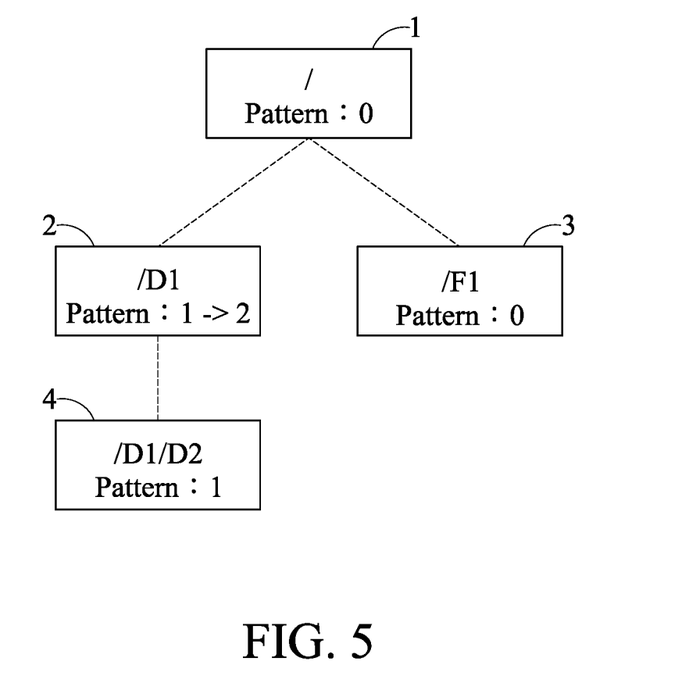

In the third embodiment, as shown in FIG. 5, the user instructs the file system to modify the ACL of the directory "/D1" under the root directory "/" of the directory tree. Before the modification, the subtree to which the directory "/D1" belongs corresponds to the pattern 1, and includes the directory tree nodes corresponding to the inodes 2 and 4, wherein the directory "/D1" is the root node of the subtree. The scope of this modification only includes one node of the subtree, instead of all nodes of the subtree. Therefore, the file system creates a new pattern 2, sets the root inode of the new pattern 2 to be the inode 2 corresponding to the directory "/D1," sets the RACL, DACL and FACL of the new pattern 2 to be the RL2, DL2 and FL2 generated by the modification, and modifies the pattern index stored in the inode 2 of the directory "/D1" from 1 to 2. In addition, the scope of this modification includes the root node of the subtree, so the file system sets the root inode of the pattern 1 corresponding to the subtree to be "none," and sets the parent pattern of the new pattern 2 to be the parent pattern 0 of the pattern 1 corresponding to the subtree. The pattern tree after this modification is shown in Table 5 below, wherein the fields modified or added due to the modification are shown in an italic and bold font.

TABLE 5

| Pattern Index | Parent Pattern Index | Root Inode | RACL | DACL | FACL |
|---|---|---|---|---|---|
| 0 | None | 1 | RL0 | DL0 | FL0 |
| 1 | 0 | *None* | RL1 | DL1 | FL1 |
| *2* | *0* | *2* | *RL2* | *DL2* | *FL2* |

Figure 6:
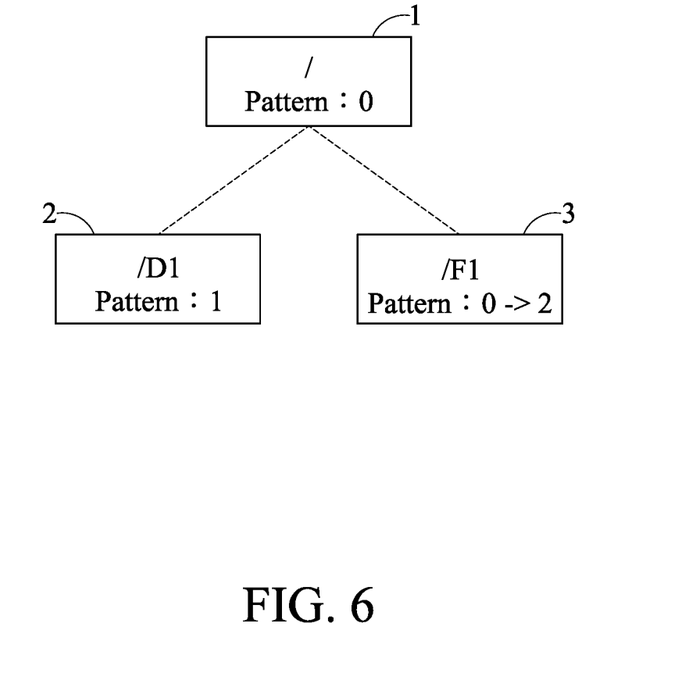

In the fourth embodiment, as shown in FIG. 6, the user instructs the file system to modify the ACL of the file "/F1" under the root directory "/" of the directory tree. Before the modification, the subtree to which the file "/F1" belongs corresponds to the pattern 0, and includes the directory tree nodes corresponding to the inodes 1 and 3. Therefore, the scope of the modification includes only one node of the subtree, instead of all nodes of the subtree, so the file system creates a new pattern 2, sets the root inode of the new pattern 2 to be the inode 3 corresponding to the file "/F1," and sets the RACL of the new pattern 2 to be the RL2 generated by the modification. Since the root node of the new subtree corresponding to the new pattern 2 is the file "/F1," and no new directory or new file can be created under the file "/F1," the file system sets the DACL and FACL of the new pattern 2 to be "none." In addition, the file system modifies the pattern index stored in the inode 3 of the file "/F1" from 0 to 2. The scope of this modification does not include the root node of the subtree to which the file "/F1" belongs before the modification, so the file system sets the parent pattern of the new pattern 2 to be the pattern 0 corresponding to the subtree. The pattern tree after this modification is shown in Table 6 below, wherein the new pattern 2 added due to this modification is shown in an italic and bold font.

TABLE 6

| Pattern Index | Parent Pattern Index | Root Inode | RACL | DACL | FACL |
|---|---|---|---|---|---|
| 0 | None | 1 | RL0 | DL0 | FL0 |
| 1 | 0 | 2 | RL1 | DL1 | FL1 |
| *2* | *0* | *3* | *RL2* | *None* | *None* |

In an embodiment, the user can instruct the file system to modify the ACLs of the root directory of a subtree of the directory tree and all descendant nodes of that root directory, regardless of whether these descendant nodes belong to the same subtree. The file system will set the RACL, DACL and FACL of the corresponding pattern of the subtree to which the root directory belongs and all descendant patterns of the corresponding pattern to be the RACL', DACL' and FACL' generated by the modification.

Figure 7:
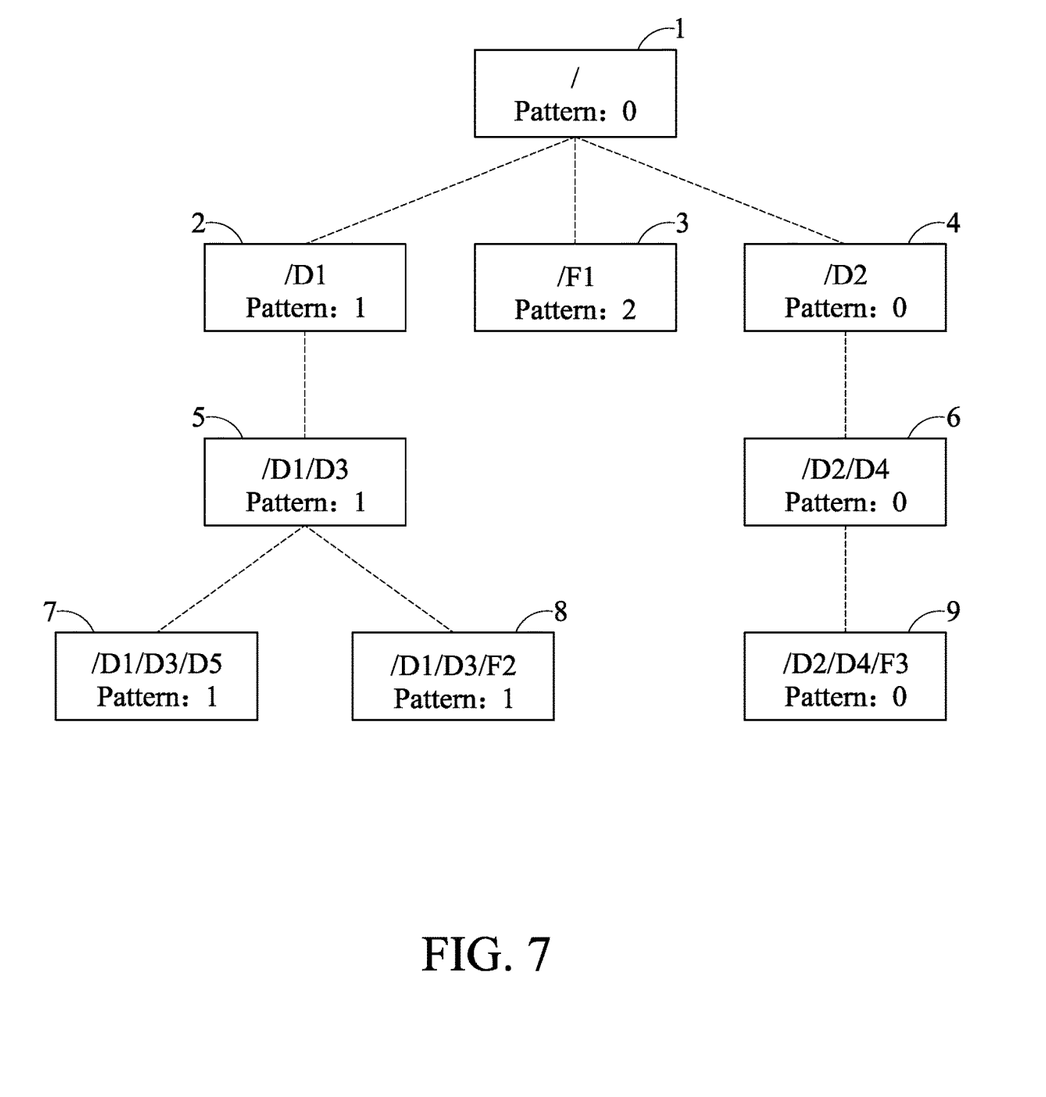

As shown in FIG. 7, the nodes corresponding to the inodes 1-9 in FIG. 7 form a directory tree, wherein the nodes corresponding to the inodes 1, 4, 6 and 9 belong to the subtree corresponding to the pattern 0, the nodes corresponding to the inodes 2, 5, 7 and 8 belong to the subtree corresponding to the pattern 1, and the node corresponding to the inode 3 belongs to the subtree corresponding to the pattern 2. If the user instructs the file system to modify the ACLs of the root directory corresponding to the inode 1 and all descendant nodes of that root directory, the file system directly modifies the RACL, DACL and FACL of the patterns 0-2 without creating a new pattern.

The pattern trees before and after the modification are shown in Table 7-1 and Table 7-2 below, respectively. In Table 7-2, the fields modified due to this modification are shown in an italic and bold font.

TABLE 7-1

| Pattern Index | Parent Pattern Index | Root Inode | RACL | DACL | FACL |
|---|---|---|---|---|---|
| 0 | None | 1 | RL0 | DL0 | FL0 |
| 1 | 0 | 2 | RL1 | DL1 | FL1 |
| 2 | 0 | 3 | RL2 | None | None |

TABLE 7-2

| Pattern Index | Parent Pattern Index | Root Inode | RACL | DACL | FACL |
|---|---|---|---|---|---|
| 0 | None | 1 | *RL0'* | *DL0'* | *FL0'* |
| 1 | 0 | 2 | *RL1'* | *DL1'* | *FL1'* |
| 2 | 0 | 3 | *RL2'* | None | None |

In an embodiment, the user can instruct the file system to modify the ACLs of a non-root node (referred to as the beginning node hereinafter) of a subtree of the directory tree and all descendant nodes of the beginning node, regardless of whether these descendant nodes belong to the same subtree. The file system will create a new pattern, set the parent pattern of the new pattern to be the pattern corresponding to the subtree to which the beginning node belongs before the modification, set the root inode of the new pattern to be the inode of the beginning node, set the RACL, DACL and FACL of the new pattern to be the RACL', DACL' and FACL' generated by the modification, respectively, and store the index of the new pattern into the inode of the beginning node. Next, the file system traverses each descendant node of the beginning node. If the descendant node is not the root node of any subtree, then the file system stores the index of the new pattern into the inode of the descendant node. If the descendant node is the root node of a subtree, then the file system performs the ACL modification as shown in FIG. 7, Table 7-1 and Table 7-2 on the descendant node, and the descendant nodes of that descendant node are not traversed.

Figure 8:
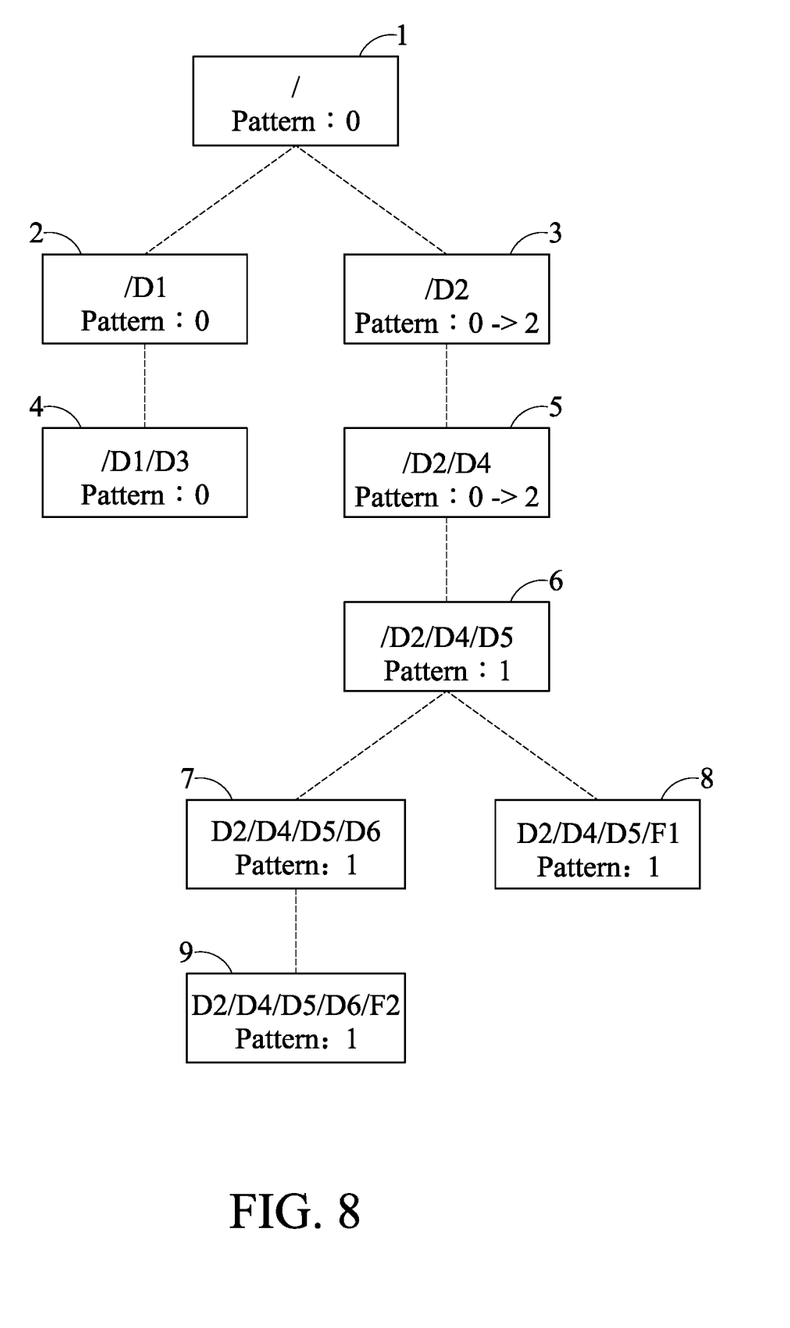

As shown in FIG. 8, before modification, the nodes corresponding to the inodes 1-5 constitute a subtree corresponding to the pattern 0, and the nodes corresponding to the inodes 6-9 constitute another subtree corresponding to the pattern 1. The user instructs the file system to modify the ACLs of the directory "/D2" corresponding to the inode 3 and all descendant nodes of the directory "/D2." In response, the file system creates a new pattern 2, sets the parent pattern of the new pattern 2 to be the pattern 0 corresponding to the subtree to which the beginning node (the directory "/D2") belongs before the modification, sets the root inode of the new pattern 2 to be the inode 3 of the beginning node, sets the RACL, DACL and FACL of the new pattern 2 to be the RL2', DL2' and FL2' generated by the modification, respectively, and stores the index of the new pattern 2 in the inode 3 of the beginning node. In addition, the beginning node "/D2" is an ancestor node of the subtree corresponding to the pattern 1, so the file system modifies the parent pattern of the pattern 1 to be the new pattern 2. Moreover, the beginning node "/D2" has five descendant nodes corresponding to the inodes 5 to 9, respectively, wherein the descendant node "/D2/D4" corresponding to the inode 5 is not the root node of any subtree, so the file system stores the index 2 of the new pattern in the inode 5 of the directory "/D2/D4." The descendant node "/D2/D4/D5" corresponding to the inode 6 is the root node of the subtree corresponding to the pattern 1, so the file system directly modifies the RACL, DACL and FACL of the pattern 1. In this way, the file system only needs to modify the storage fields of the pattern 1 in the pattern table, so as to quickly modify the ACL of each node in the subtree corresponding to the pattern 1, instead of traversing the subtree to modify the ACL of each node one by one as in the conventional technique. The pattern tree after this modification is shown in Table 8 below, wherein the fields added or modified due to the modification are shown in an italic and bold font.

TABLE 8

| Pattern Index | Parent Pattern Index | Root Inode | RACL | DACL | FACL |
|---|---|---|---|---|---|
| 0 | None | 1 | RL0 | DL0 | FL0 |
| 1 | *2* | *6* | *RL1'* | *DL1'* | *FL1'* |
| *2* | *0* | *3* | *RL2'* | *DL2'* | *FL2'* |

In an embodiment, the user can instruct the file system to modify the ACLs of all nodes of any subtree in the directory tree. The file system will set the RACL, DACL and FACL of the pattern corresponding to the subtree to be the RACL', DACL' and FACL' generated by the modification. As shown in FIG. 7, if the user instructs the file system to modify the ACLs of all nodes of the subtree corresponding to the pattern 1 (i.e., the nodes corresponding to the inodes 2, 5, 7 and 8), the file system will modify the pattern 1 as shown in Table 9 below, wherein the fields modified due to the modification are shown in an italic and bold font.

TABLE 9

| Pattern Index | Parent Pattern Index | Root Inode | RACL | DACL | FACL |
|---|---|---|---|---|---|
| 0 | None | 1 | RL0 | DL0 | FL0 |
| 1 | 0 | 2 | *RL1'* | *DL1'* | *FL1'* |
| 2 | 0 | 3 | RL2 | None | None |

In another embodiment, the inheritance setting of each ACE in the RACL of each pattern can be set to indicate, in the corresponding subtree of the pattern, which descendant nodes of the root node of the subtree are allowed to inherit the ACE at the time of creation, wherein the inheritance setting can be set to allow all descendant nodes of the root node to inherit the ACE, or be set to allow none of the descendant nodes of the root node to inherit the ACE, or be set to allow only the descendant nodes from the first generation to the N-th generation of the root node to inherit the ACE, wherein N is a positive integer.

Taking the subtree corresponding to the pattern 1 in the embodiment of FIG. 7 as an example, if the number N of an ACE in the RACL of the root node "/D1" is equal to 1, the descendant node "/D1/D3" inherits the ACE, while the descendant nodes "/D1/D3/D5" and "/D1/D3/F2" do not inherit the ACE. If the number N of the ACE is equal to 2, the descendant nodes "/D1/D3," "/D1/D3/D5" and "/D1/D3/F2" all inherit the ACE, and the other descendant nodes in the same generation as any of those three descendant nodes also inherit the ACE, but the descendant nodes of the third and later generations of the root node "/D1" do not inherit the ACE.

In an embodiment where the inheritance setting may be set to allow only a part of the descendant nodes to inherit an ACE, there may be multiple versions of the DACL and the RACL. Taking the subtree corresponding to the pattern 1 in the embodiment of FIG. 8 as an example, if the number N of an ACE in the RACL of the root node "/D2/D4/D5" is equal to 1, then the descendant nodes "/D2/D4/D5/D6" and "/D2/D4/D5/F1" of the first generation both inherit the ACE, but the descendant node "/D2/D4/D5/D6/F2" of the second generation does not inherit the ACE. Therefore, the file nodes "/D2/D4/D5/F1" and "/D2/D4/D5/D6/F2" have different FACLs. Similarly, the DACLs of directory nodes of different generations may also be different. In such an embodiment, fields may be added in the pattern table for storing multiple versions of DACLs and FACLs. Alternatively, in another embodiment, the pattern table may only store the RACLs of each pattern without storing the corresponding DACLs and FACLs. In this case, when it is necessary to check the user's access permissions to a node in the directory tree, the DACLs and the FACLs are generated according to the RACLs of the pattern corresponding to the subtree to which the node belongs.

In addition to the above-mentioned ACL management method, the present disclosure further provides a data storage device, such as a mobile electronic device, a computer, or a server with a data storage function. A file system is installed in the data storage device for executing the above-mentioned ACL management method.

The present disclosure further provides a computer-readable medium, such as a memory, a floppy disk, a hard disk, or an optical disk. The computer-readable medium can be applied to the above-mentioned data storage device, and can store instructions for executing the above-mentioned ACL management method.

In summary, the present disclosure can establish a pattern tree corresponding to the ACL inheritance relationships in the directory tree, and summarize and store the ACLs of nodes belonging to the same inheritance relationship in each pattern, thereby simplifying the tree structure of the ACLs, so as to greatly reduce the space required to store ACLs, and can achieve fast traversal and recursive modification of the ACLs.

While some of the embodiments of the present disclosure have been described in detail above, it is, however, possible for those skilled in the art to make various modifications and changes to the embodiments shown without substantially departing from the teaching and advantages of the present disclosure. Such modifications and changes are encompassed in the spirit and scope of the present disclosure as set forth in the appended claims.

What is claimed is:

1. An access control list (ACL) management method used in a file system installed in a data storage device, wherein the data storage device is a mobile electronic device, a computer, or a server, the ACL management method comprising:
    storing an ACL pattern, the ACL pattern corresponding to a subtree of a directory tree in the file system and including a root access control list (RACL), an ACL of a root node of the subtree being the RACL;
    generating an inherited directory access control list (DACL) according to the RACL as an ACL of each non-root directory of the subtree;
    generating an inherited file access control list (FACL) according to the RACL as an ACL of each non-root file of the subtree; and
    determining, by the file system, whether a user has permissions for accessing each node of the subtree according to the RACL, the DACL, or the FACL.

2. The ACL management method according to claim 1, wherein the ACL pattern further comprises the DACL and the FACL.

3. The ACL management method according to claim 1, wherein the ACL pattern does not include the DACL and the FACL, and the DACL and the FACL are generated according to the RACL when it is necessary to check access permissions of a user on a node of the subtree.

4. The ACL management method according to claim 1, wherein the RACL comprises at least one access control entry (ACE) and inheritance setting of each of the at least one ACE, each ACE comprises access permissions of a user or a user group on a node of the subtree, the DACL comprises the ACEs and the inheritance settings that allow inheritance, and the FACL comprises the ACEs that allow inheritance and does not comprise any inheritance setting.

5. The ACL management method according to claim 1, further comprising:
    storing an ACL pattern tree, wherein the directory tree comprises a plurality of the subtrees, and the ACL pattern tree comprises a plurality of the ACL patterns, wherein if a root node of a first subtree of the subtrees is an ancestor node of a root node of a second subtree of the subtrees, the ACL patterns comprise a first ACL pattern corresponding to the first subtree and a second ACL pattern corresponding to the second subtree, and the first ACL pattern is an ancestor node of the second ACL pattern.

6. The ACL management method according to claim 5, wherein an ACL of each non-root node of the first subtree is inherited from the root node of the first subtree, an ACL of each non-root node of the second subtree is inherited from the root node of the second subtree, and an ACL of each node of the second subtree is not inherited from the first subtree.

7. The ACL management method according to claim 6, wherein each of the ACL patterns of the ACL pattern tree further comprises an index of the ACL pattern, an index of a parent node of the ACL pattern, and an index of an index node (inode) of the root node of the subtree corresponding to the ACL pattern.

8. The ACL management method according to claim 7, wherein when modifying ACLs of nodes of the second subtree, the ACL management method further comprising:
    if a scope of the modifying only comprises a part of the nodes of the second subtree, creating a third ACL pattern and storing an index of the third ACL pattern in an inode of each of the nodes in the scope, wherein the third ACL pattern comprises a new RACL generated by the modifying; and
    if the scope comprises all the nodes of the second subtree, setting the RACL of the second ACL pattern to be the new RACL without creating the third ACL pattern.

9. The ACL management method according to claim 8, wherein the first ACL pattern is a parent node of the second ACL pattern, and when creating the third ACL pattern, the ACL management method further comprising:
    if the scope does not comprise the root node of the second subtree, setting a parent node of the third ACL pattern to be the second ACL pattern; and
    if the scope comprises the root node of the second subtree, setting the parent node of the third ACL pattern to be the first ACL pattern.

10. A data storage device with a file system installed in the data storage device to execute the ACL management method according to claim 1, wherein the data storage device is a mobile electronic device, a computer, or a server.

11. A non-transitory computer-readable medium applied in a data storage device and storing instructions to execute the ACL management method according to claim 1, wherein the data storage device is a mobile electronic device, a computer, or a server.

* * * * *